United States Patent [19]

Justice

[11] Patent Number: 5,782,944
[45] Date of Patent: Jul. 21, 1998

[54] MOISTURE RESISTANT AIR FILTER

[75] Inventor: Thomas A. Justice, Henderson, N.C.

[73] Assignee: Purolator Products Air Filtration Company, Henderson, N.C.

[21] Appl. No.: 819,930

[22] Filed: Mar. 18, 1997

[51] Int. Cl.⁶ .................................................. B01D 46/00
[52] U.S. Cl. .............................. 55/495; 55/497; 55/499; 55/501; 55/DIG. 31
[58] Field of Search ........................... 55/DIG. 31, 495, 55/501, 499, 497, 511

[56] References Cited

U.S. PATENT DOCUMENTS

| | | | |
|---|---|---|---|
| Re. 17,760 | 8/1930 | Farrell | 428/354 |
| 1,799,797 | 4/1931 | Huempfner | 442/149 |
| 2,058,669 | 10/1936 | Dollinger | 55/499 |
| 2,118,152 | 5/1938 | Bryce | 428/191 |
| 2,138,874 | 12/1938 | Myers | 55/DIG. 31 |
| 2,160,003 | 5/1939 | Slayter et al. | 55/DIG. 31 |
| 2,965,197 | 12/1960 | Dow et al. | 55/DIG. 31 |
| 3,234,717 | 2/1966 | Korn | 55/501 |
| 3,429,434 | 2/1969 | Hickin | 55/DIG. 31 |
| 3,497,065 | 2/1970 | Johnson, Jr. | 210/231 |
| 3,603,218 | 9/1971 | Ludder | 493/55 |
| 3,853,529 | 12/1974 | Boothe et al. | 55/499 |
| 3,970,440 | 7/1976 | Copenhefer et al. | 55/DIG. 31 |
| 3,992,173 | 11/1976 | Wharton et al. | 55/501 |
| 4,045,350 | 8/1977 | Kupf et al. | 210/232 |
| 4,551,123 | 11/1985 | Inagaki | 493/108 |
| 4,561,587 | 12/1985 | Wysocki | 55/501 |
| 4,570,844 | 2/1986 | Wysocki | 55/DIG. 31 |
| 5,228,272 | 7/1993 | Calvert et al. | 53/477 |
| 5,427,309 | 6/1995 | Voss | 229/182 |

FOREIGN PATENT DOCUMENTS

| | | | |
|---|---|---|---|
| 183997 | 7/1936 | Switzerland | 55/DIG. 31 |

Primary Examiner—Duane S. Smith
Attorney, Agent, or Firm—Joseph V. Tassone

[57] ABSTRACT

A moisture resistant air filter has a generally planar air permeable filter media with an upstream and downstream surface and a peripheral edge. A frame surrounds the filter media peripheral edge providing an inner peripheral frame surface to which the filter media peripheral edge is attached. The upstream and downstream panels are integrally formed with the frame, the upstream and downstream panels having large openings therethrough. The frame and the panels are formed of paper board of about 0.016 to 0.060 caliper and coated with polyethylene or polypropylene.

11 Claims, 2 Drawing Sheets

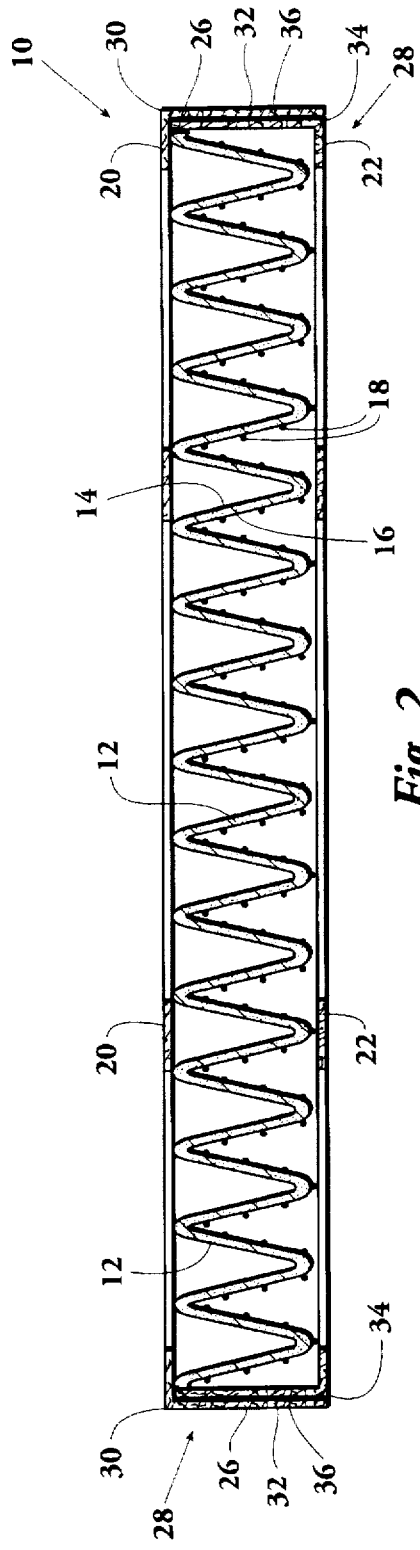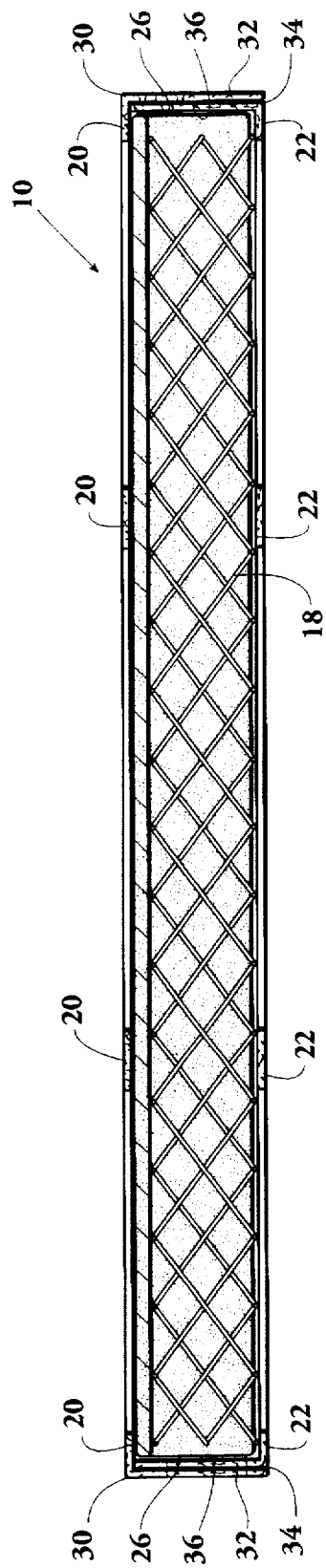

MOISTURE RESISTANT AIR FILTER

CROSS-REFERENCE TO RELATED APPLICATIONS

This application is not related to any pending patent application.

CROSS-REFERENCE TO MICROFICHE APPENDIX

This application is not related to any microfiche appendix.

BACKGROUND OF THE INVENTION

Air filters are commonly used both domestically and industrially. Virtually every home heating and air conditioning system as well as commercial and industrial systems employ air filters. Such filters, which can be placed in either the discharge or the intake stream permit the passage of air therethrough with a minimal pressure drop, and extract and retain dust particles, lint and other physical contaminants. Since air filters are required to handle high volumes of air, they are typically designed to be expendible, that is, are used one time and then discarded. Further, since air filters in the typical application have a relatively short useful life they are manufactured as economically as possible so as to permit, and in fact, to encourage frequent replacement. For this reason, air filters have long been manufactured employing a frame that surrounds the perimeter of an air filter media made of cardboard paper, that is, cardboard paper is the most economical and useful media for making an air filter frame. Further, cardboard paper is ideal in many ways for such application since it is economical and is not a contaminant to the environment since it can be burned, and if not burned is biodegradable. One limitation however in the use of air filter frames made of paper board is that paper is highly absorptive of water and water vapor. Further, while dry paper board has good mechanical properties, that is, it is relatively strong and stiff per unit of area or weight, paper board becomes exceedingly weak upon the absorption of moisture to the point that a paper board that is thoroughly wet loses substantially all of its strength and rigidity.

For this reason, paper board has not found good acceptance in air filter applications subject to moisture and consequently in many applications air filters having frames made of metal or plastic have been employed where moisture conditions exist. Air filters having metal or plastic frames are more expensive to manufacture and more environmentally damaging since metal is not combustible and most plastics are not biodegradable.

Manufacturers of air filters have sought unsuccessfully to design an economical air filter having the advantage of a frame made of paper board that does not surcome to the problems encountered when moisture conditions exist. It is therefore an object of this invention to provide an air filter having a frame and side panels formed of paper board, to thereby achieve the advantages and benefits of paper board, but that is resistant to the deleterious effect of moisture.

For background information relating to paper products and applications of paper materials wherein consideration is given to the deleterious effect on paper of moisture, reference may be had to the following previously issued United States patents:

| PATENT NO. | INVENTOR | TITLE |
| --- | --- | --- |
| Re. 17760 | Farrell | Coated Paper |
| 1,799,797 | Huempfner | Adhesive |
| 2,118,152 | Bryce | Method of Manufacturing Moisture and Moisture Vaporproof Papers |
| 3,497,065 | Johnson, Jr. | Plate For Plate and Frame Filter Presses |
| 3,603,218 | Ludder | Method of Making Paper Container Having A High Gloss Exterior Finish and Wax Coated Interior and Bottom Surfaces |
| 4,045,350 | Kupf et al | Filter Assembly Made Of Thermoplastic Materials |
| 4,551,123 | Inagaki | Water-Proof Paper Container and Its Manufacturing Method |
| 5,228,272 | Calvert et al | Product and Process For Heat Sealing A Paperboard Carton Having Polymer Coating On One Side Only |
| 5,427,309 | Voss | Corrugated Box With V-Grooved Wall |

BRIEF SUMMARY OF THE INVENTION

A moisture resistant air filter includes a generally planar air permeable filter media having an upstream surface and a downstream surface. By "planar" filter media is meant filter media that lies essentially in a plane. In one preferred embodiment the planar filter media is of corrugated cross-sectional shape, corrugations being employed to substantially increase the surface area of the filter media. In another embodiment the filter media may be in the form of a pad, such as a high loft non-woven filter media pad made of polyester, fiberglass, polyurethane, polypropylene, polyethylene or other synthetics. The generally planar air permeable filter media has a peripheral edge.

A frame surrounds the filter media peripheral edge. The frame preferably has a generally U-shaped cross-sectional configuration providing a lateral border defining portion having an inner surface to which the filter media peripheral edge is attached, such as by use of adhesives. The frame can also be a pinched type that surrounds the filter media, the pinched type being more commonly used for less expensive air filters.

The filter includes an upstream panel having edges secured to the frame. The upstream panel is contiguous to the filter media upstream surface. In like manner, a downstream panel has edges secured to the frame and is contiguous to the filter media downstream surface. In the preferred embodiment of the invention, the upstream panel and the downstream panel are both integrally formed with the frame. More accurately, the upstream panel and the downstream panel are each provided with circumferential edges that are folded at an angle normal to the panel and are secured to each other to thereby form the filter frame.

Each of the panels has large area openings.

The panels, including the portions that form the air filter frame are formed of paper board of about 0.016 to 0.060 caliper and the paper board is coated with polyethylene or polypropylene.

The paper board is preferably solid bleached sulfate paper board and the polyethylene or polypropylene is applied to coat the board to a thickness of about 0.00075 inches.

In a most preferred embodiment of the invention, the paper board of which the panels, including the integrally formed frame is made, is milk carton stock. By "milk carton stock" is meant paper board that is commonly supplied to the dairy industry for use in making milk cartons. Paper milk cartons are used only once and discarded; therefore, large quantities of such milk carton paper stock are produced. Further, in the manufacturer of milk cartons, there is substantial reject material, that is, material that is improperly printed or dimensioned for use in machines for framing milk cartons. Rejected milk carton stock provides a good source of paper for the use in manufacturing air filters employing the concepts of this invention.

A more complete understanding of the invention will be obtained from the following description of the preferred embodiments taken in conjunction with the attached drawings.

DESCRIPTION OF THE DRAWINGS

FIG. 2 is a cross-sectional view taken along the line 2—2 of FIG. 1, showing the corrugated filter media, the frame and the panels that together constitute the air filter.

FIG. 3 is a cross-sectional view as taken along the line 3—3 of FIG. 1.

DESCRIPTION OF THE PREFERRED EMBODIMENTS

Figure 1:
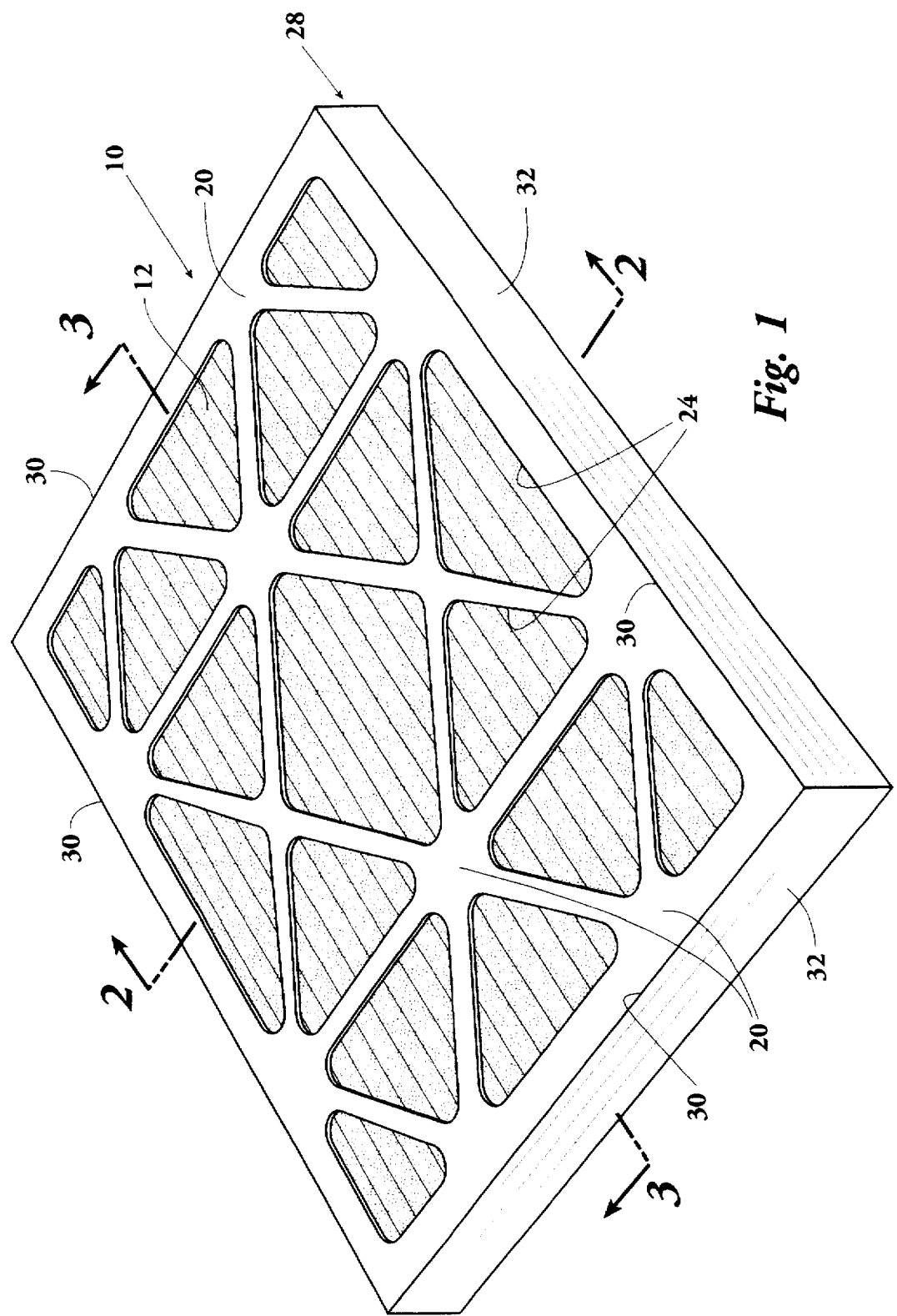
FIG. 1 is an isometric view of a moisture resistant air filter made according to the principals of this invention.

Referring to the drawings, a moisture resistant air filter of this invention is generally indicated by the numeral 10 and includes a filter media 12. Filter media 12 is in a sheet that is generally planar, as "generally planar" is used in a broad sense. In the specific arrangement of filter media 12 as illustrated in the drawings, the filter media is in the form of a relatively thin sheet of filter material folded in a corrugated pattern to thereby substantially increase the exposed surface area. Filter media 12 is of the type commonly employed for air filters and is made of porous material that permits air to pass through but that intercepts solid particles, such as dust, lint and so forth. In other embodiments (not illustrated) filter media 12 may be in the form of a pad, such as a high loft non-woven filter media pad made of polyester, fiberglass, polyurethane, polypropylene, polyethylene or other synthetics.

Filter media 12 has an upstream surface 14 and a downstream surface 16. The upstream surface 14 is the surface that receives the flow of air as it first contacts the filter and the downstream surface 16 is the surface by which air, having passed through the filter media leaves the filter. In the embodiment illustrated, the filter media has on its downstream surface 16 a wire mesh 18 characteristically formed of expanded metal. Wire mesh 18 serves to structurally reinforce the filter media 12 but is not directly involved in the filtration function since the spacing between the wires making up the wire mesh is relatively large.

In order to support filter media 12 in a mechanical device through which air passes, it is normally necessary to include a frame. That is, a filter element constitutes a sheet of filter media (which may be folded in a corrugated pattern as illustrated) within a frame by which the filter media is supported within an air passageway. This invention is concerned with the frame by which the filter media is supported. The frame includes opposed panels. In FIG. 1 an upstream panel 20 is seen while the cross-sectional view of FIGS. 2 and 3 show the upstream panel 20 and a similar and substantially identical downstream panel 22. Each of the panels has large openings therein, openings 24 being shown in upstream panel 20 and similar large openings are provided in downstream panel 22, the large openings affording free flow of air through the filter.

Surrounding the circumferential periphery 26 of filter media 12 is a frame generally indicated by the numeral 28. In the preferred arrangement of the invention, frame 28 is integrally formed from portions of upstream and downstream panels 20 and 22. As seen in FIGS. 2 and 3, upstream panel 20 is folded along fold lines 30 to provide frame portions 32. Fold lines 30 are provided around the full perimeter of upstream panel 20. In like manner, downstream panel 22 has fold lines 34 that provide frame portions 36 around the full perimeter of downstream panel 22. The circumferential peripheral portions 32 of upstream panel 20 overlap the circumferential peripheral portions 36 of downstream panel 22 and they are bonded together by adhesive. The overlapped circumferential portions 32 and 36 provide double thickness paper board that constitutes the frame 28 around the periphery 26 of filter media 12.

The peripheral edge 26 of filter media 12 must be sealed to the interior of the frame 28, that is, more specifically, to the interior of downstream panel circumferential portions 36 so as to prevent air from passing between the filter media and the frame. This can be achieved in a variety of ways. In one way the peripheral edge 26 of the filter media may be bonded by use of adhesive to the interior surface of the frame. In another way, and particularly applicable in the present invention, the peripheral edge 26 can be secured to the frame by heat sealing the edge by melting the coating on downstream panel peripheral portions 36.

Panels 20 and 22, together with their integral peripheral portions 32 and 36 that are folded to form the filter frame 28, are formed of a moisture resistant paper board that is of about 0.016 to 0.060 caliper and coated with polyethylene or polypropylene. Most particularly, the base material of which upstream and downstream panels 20 and 22 are formed, including their folded portions 32 and 36 which form the filter frame, is commonly referred to as "milk carton stock". Such "milk carton stock" is a commonly available paper product formed of solid bleached sulfate of about 0.016 to 0.060 caliper coated with polyethylene or polypropylene. The coating, using either of these materials, is preferably of a thickness of about 0.00075 inches.

Experimental air filters incorporating the principals of this invention have been manufactured for evaluation utilizing waste milk carton stock having the following parameters:

| Board Composition | Solid Bleached Sulfate |
|---|---|
| Caliper: | .024 |
| Coating: | .00075 Polyethylene |
| Stiffness (Taber Test) | MD 295 |
| | CD 130 |
| Brightness: | 78.5 |
| Color: | 5.5 |
| Scott Bond: | 75 |
| Moisture: | 6.0% |
| Tear: | 308 |
| Sheffield Smoothness: | 300 Felt side |
| | 280 Wire side |

Milk carton stock has proven to be highly adaptive to provide an air filter that is inexpensive to manufacture, susceptible of acceptable environmental disposal and resistant to moisture. While other products could be employed utilizing metal, plastic or more exotic or expensive coated or impregnated paper material, the criticality of this invention is that a moisture resistant air filter can be manufactured using commercially available, inexpensive milk carton stock from the milk carton production industry that has heretofore not had a significant alternative use.

While the frame illustrated is the type that is in a cross-section of one portion of the frame, U-shaped, the frame can also be of a type well known in the trade as a pinched type frame. Pinched type frames are employed for air filters where economy is a major consideration.

The fact that an air filter element can be produced that is effective to resist moisture conditions and, at the same time, highly economical, is extremely important in that by achieving such effectiveness and economy, the users of air filters are inclined to more frequently replace filter elements. After extensive use, filter elements absorb and retain increased quantities of dirt, dust and lint as extracted from the air and therefore impede the flow of air through the filter causing air volume to decrease and heating and air conditioning efficiencies to diminish, thus resulting in decreased energy efficiency of heating and air conditioning systems. Further, air filters that absorb moisture are the source of mold that is easily transmitted by air passing through the filter. The mold resistant and economical air filter disclosed herein leads to more efficient and healthy heating and air conditioning systems.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A moisture resistant air filter comprising:

a generally planer air permeable filter media having a peripheral edge, an upstream surface and a downstream surface;

a frame surrounding said filter media peripheral edge, the frame having a border defining portion to which said filter media peripheral edge is attached;

an upstream panel having edges secured to said frame and contiguous to said filter media upstream surface; and a downstream panel having edges secured to said frame and contiguous to said filter media downstream surface, said upstream and downstream panels each having large area openings therethrough, said frame being integrally formed of peripheral portions of said upstream and downstream panels, said upstream and downstream panels including the integral portions forming said frame being formed of solid bleached milk carton stock paper board of about 0.016 to 0.060 caliper and coated on both opposite sides thereof with polyethylene or polypropylene.

2. A moisture resistant air filter according to claim 1 wherein said generally planar air permeable filter media is corrugated providing corrugated upstream and downstream surfaces.

3. A moisture resistant air filter according to claim 1 wherein said paper board is coated with polyethylene or polypropylene to a thickness of about 0.00075 inches.

4. A moisture resistant air filter according to claim 1 wherein said upstream panel and said downstream panel each has folded edges around the periphery thereof, said frame being formed of the folded edges.

5. A moisture resistant air filter according to claim 1 wherein said filter media includes an expanded metal wire backing on said downstream side.

6. A moisture resistant air filter according to claim 1 wherein said frame has a generally U-shaped cross-sectional configuration providing lateral border defining portion having an inner surface to which said filter media peripheral edge is attached.

7. An air filter comprising:

a generally planar air permeable filter media having a rectangular peripheral edge, an upstream surface and a downstream surface;

a rectangular upstream panel overlaying said filter media upstream surface and having air passage openings therethrough and having integral right angle folded portions at each edge; and a rectangular downstream panel overlaying said filter media downstream surface and having air passageway openings therethrough and having integral right angle folded portions at each edge, the upstream and downstream panels being formed of solid bleached sulfate milk carton stock paper board coated on both opposite sides thereof with polyethylene and polypropylene, said folded portions of said upstream panel being contiguous and bonded to the folded portions of the downstream panel, the bonded folded panel portions forming a frame around said periphery of said filter media, the upstream and downstream panels thereby fully encompassing said filter media.

8. An air filter according to claim 6 wherein said generally planar air permeable filter media is corrugated providing corrugated upstream and downstream surfaces.

9. An air filter according to claim 6 wherein said paper board is solid bleached sulfate paper board.

10. An air filter according to claim 6 wherein said paper board is coated with polyethylene or polypropylene to a thickness of about 0.00075 inches.

11. An air filter according to claim 6 wherein said filter media includes an expanded metal wire backing on said downstream side.

* * * * *